(12) United States Patent
McCune, Jr.

(10) Patent No.: US 7,468,601 B2
(45) Date of Patent: *Dec. 23, 2008

(54) DIRECT PHASE AND FREQUENCY DEMODULATION

(75) Inventor: Earl W. McCune, Jr., Santa Clara, CA (US)

(73) Assignee: Panasonic Corporation, Osaka (JP)

( * ) Notice: Subject to any disclaimer, the term of this patent is extended or adjusted under 35 U.S.C. 154(b) by 668 days.

This patent is subject to a terminal disclaimer.

(21) Appl. No.: 11/136,607

(22) Filed: May 23, 2005

(65) Prior Publication Data

US 2005/0270090 A1  Dec. 8, 2005

Related U.S. Application Data

(63) Continuation of application No. 09/746,249, filed on Dec. 21, 2000, now Pat. No. 6,969,984.

(51) Int. Cl.
*G01R 25/00* (2006.01)
*G06M 1/10* (2006.01)

(52) U.S. Cl. .................... 324/76.77; 324/76.48

(58) Field of Classification Search ............ None
See application file for complete search history.

(56) References Cited

U.S. PATENT DOCUMENTS

| | | | |
|---|---|---|---|
| 4,649,336 A * | 3/1987 | Bindner et al. ........... | 324/118 |
| 5,220,293 A | 6/1993 | Rogers | |
| 6,021,157 A | 2/2000 | Kanterakis et al. | |
| 6,075,410 A | 6/2000 | Wildhagen | |
| 6,104,762 A | 8/2000 | Fujimura | |
| 6,107,848 A | 8/2000 | Pickering et al. | |
| 6,163,209 A | 12/2000 | Myers | |
| 2002/0000800 A1 | 1/2002 | Hill | |

* cited by examiner

*Primary Examiner*—Diego Gutierrez
*Assistant Examiner*—Jeff Natalini
(74) *Attorney, Agent, or Firm*—McDermott Will & Emery LLP

(57) ABSTRACT

The present invention, generally speaking, provides a time shift angle demodulator that is of simple construction and has an extended linear range. Range extension is achieved by using the input signals directly, not simply post-processing the S-PFD outputs. In accordance with one embodiment of the invention, a method of measuring the phase or frequency of a periodic input signal uses a periodic reference signal and includes comparing the input signal to the reference signal to obtain a lead signal and a lag signal; changing the count of an up/down counter in dependence on the input signal, the reference signal, the lead signal and the lag signal; and using the lead signal, the lag signal and the count signal to produce a phase or frequency signal. In accordance with another embodiment of the invention, an apparatus for measuring the phase or frequency of a periodic input signal uses a periodic reference signal and includes a comparison circuit for comparing the input signal to the reference signal to obtain a lead signal and a lag signal; a logic circuit, including an up/down counter, responsive to the input signal, the reference signal, the lead signal and the lag signal to change the count of the up/down counter; and circuitry for using the lead signal, the lag signal and the count signal to produce a phase or frequency signal.

4 Claims, 3 Drawing Sheets

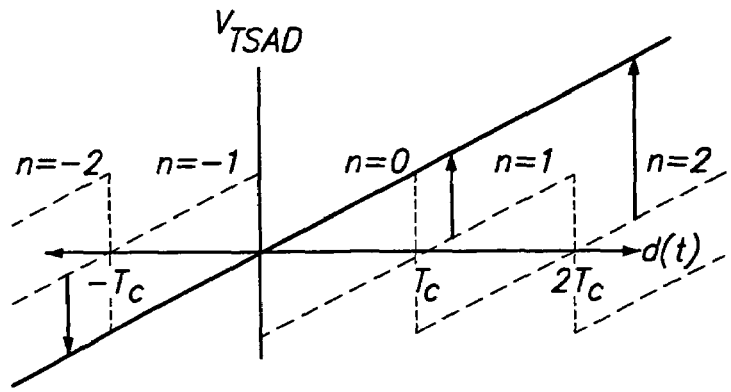
FIG. 5 *(PRIOR ART)*
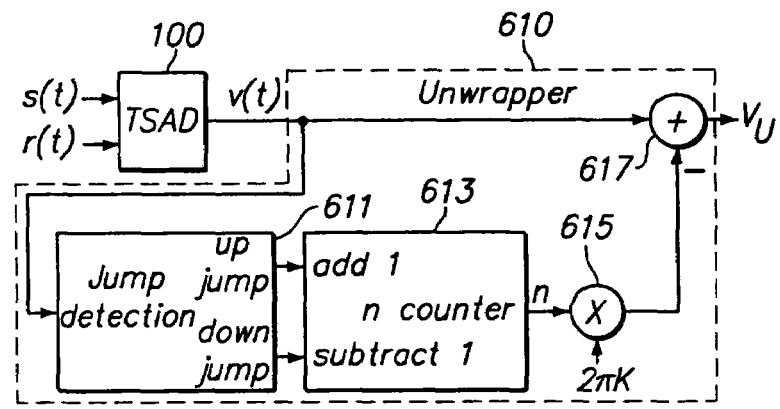
FIG. 6 *(PRIOR ART)*
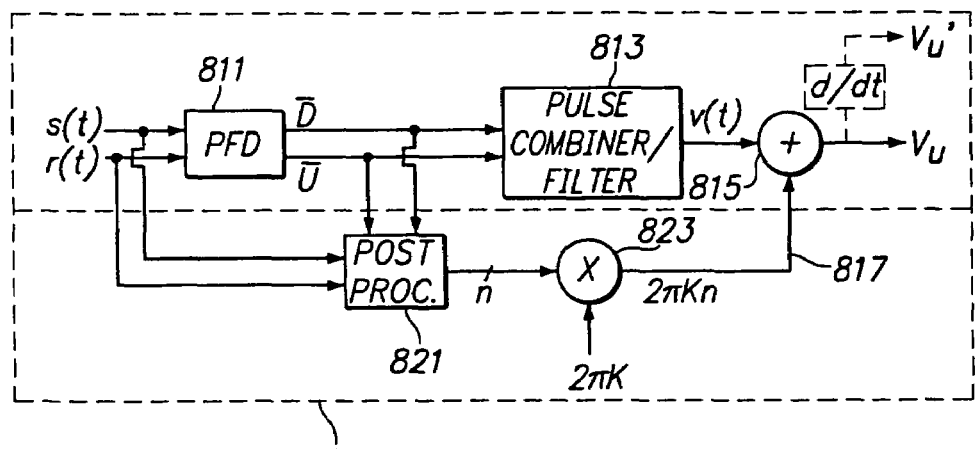
FIG. 8

DIRECT PHASE AND FREQUENCY DEMODULATION

CROSS REFERENCE TO RELATED APPLICATIONS

This is a continuation of prior U.S. application Ser. No. 09/746,249, filed on Dec. 21, 2000 now U.S. Pat. No. 6,969,984.

BACKGROUND OF THE INVENTION

1. Field of the Invention

The present invention relates to direct phase and frequency demodulation.

2. State of the Art

Much attention has been focused in recent years on the realization of radio systems using digital logic. Digital logic is less subject to manufacturing variability and is often much simpler and consumes lower power than an equivalent analog structure. In particular, current communications techniques, at least in wireless communications, are based in large part on quadrature modulation and demodulation. Such modulators and demodulators are relatively power-hungry and subject to various inaccuracies and limitations that become apparent as performance is pushed to higher levels.

One proposal for a generally-applicable angle demodulator is described in the dissertation by the present inventor entitled *Extended Phase Shift Keying*, deposited in the library of the University of California at Davis in August, 1998. Of particular interest is the so-called Time-Shift Angle Demodulator (TSAD), described in detail in Section 3.6.2 and Appendix B of the dissertation.

A block diagram of a TSAD 100 is shown in FIG. 1. The TSAD includes two stages, a time difference detector 101 and a pulse combiner/filter 103. The time difference detector measures time between adjacent the rising zero crossings of the two input signals s(t) and r(t). The first of these input signals is the angle modulated signal s(t). The second input signal is an applied reference signal r(t), which is assumed to be matched to the carrier of the angle modulated signal.

The timing information measured by the tune difference detector is provided on one of two outputs, a(t) and b(t), at any one time, as a fixed amplitude pulse with width equal to the timing difference of the input signals. The output selected depends on which input signal a rising zero crossing is observed first. If a rising zero crossing of the modulated signal s(t) occurs first, then the measurement output appears on the phase read output, a(t). If a rising zero crossing of the reference signal r(t) occurs first, then the measurement output appears on the phase lag output, b(t).

The time difference detector may be realized as a sequential phase-frequency detector (S-PFD), as shown in FIG. 2. The pulse combiner/filter may take the form of a differencing circuit followed by a low-pass filter (LPF).

Referring to FIG. 3, an example of operation of the TSAD is shown. The input signal s(t) is assumed to have a frequency 20% lower than that of the reference signal r(t). Initially, the phase of s(t) leads the phase of r(t). The two outputs from the time difference detector, a(t) and b(t), are shown. As the phase of s(t) shifts from leading to lagging the phase of r(t), a transition occurs in which pulses, instead of appearing in the output signal a(t), appear instead in the output signal b(t). The signals a(t) and b(t) are combined to form a difference signal a(t)-b(t), which is low-pass filtered, yielding an output signal v(t) that reflects the linear phase ramp relationship between the two input signals. Because the S-PFD aliases when phase shifts exceed $2\pi$, the S-PFD output "jumps" following the accrual of $2\pi$ radian phase shift on the reference signal with respect-to the input signal. Corresponding jumps are reflected in the output signal v(t).

The transfer characteristic of the TSAD of FIG. 1 is shown in FIG. 4, showing the output v(t) as a function of the time difference d(t), where $T_e$ represents the period of the reference signal. The transfer characteristic consists of overlapping line segments each having an extent of 2Tc, which corresponds to $4\pi$ radians of phase for the reference signal. When the time difference between the input signals becomes greater than $2\pi$ or less than $-2\pi$, a jump occurs to the next line segment as shown by the arrows in FIG. 4.

In order to increase the usefulness of the TSAD, it is necessary to eliminate the foregoing jumping characteristic, by shifting the line segments of FIG. 4 to form a single continuous line, as illustrated in FIG. 5. Such modification of the transfer relation may be accomplished using a "phase unwrapper," a diagram of which is shown in FIG. 6. The phase unwrapper 610 includes a jump detection unit 611, a counter 613, a multiplier 615 and an adder 617. In operation, when a jump is detected, the appropriate signal offset, expressed as $2\pi K$, is added or subtracted to form a corrected output signal $v_u$.

Referring to FIG. 7, correction may also be achieved using phase scaling. Both the input signals are passed through respective 1/N frequency dividers 701, 703 before being applied to the TSAD of FIG. 1. In order for the input signal to effect a $2\pi$ phase shift at the input of the TSAD, there must be a $2\pi N$ phase shift at the input to the frequency divider. Thus, with respect to the original signal, the TSAD appears to have had its range extended by a factor of N.

Further simplification of the TSAD, while preserving the transfer relationship of FIG. 5, is desired.

SUMMARY OF THE INVENTION

The present invention, generally speaking, provides a time shift angle demodulator that is of simple construction and has an extended linear range. Range extension is achieved by using the input signals directly, not simply post-processing the S-PFD outputs. In accordance with one embodiment of the invention, a method of measuring the phase or frequency of a periodic input signal uses a periodic reference signal and includes comparing the input signal to the reference signal to obtain a lead signal and a lag signal; changing the count of an up/down counter in dependence on the input signal, the reference signal, the lead signal and the lag signal; and using the lead signal, the lag signal and the count signal to produce a phase or frequency signal. In accordance with another embodiment of the invention, an apparatus for measuring the phase or frequency of a periodic input signal uses a periodic reference signal and includes a comparison circuit for comparing the input signal to the reference signal to obtain a lead signal and a lag signal; a logic circuit, including an up/down counter, responsive to the input signal, the reference signal, the lead signal and the lag signal to change the count of the up/down counter; and circuitry for using the lead signal, the lag signal and the count signal to produce a phase or frequency signal.

BRIEF DESCRIPTION OF THE DRAWING

The present invention may be further understood from the following description in conjunction with the appended drawing. In the drawing:

FIG. 5 is a plot of a desired transfer characteristic of the TSAD of FIG. 1;

FIG. 6 is a diagram of a post-processing "phase unwrapper" used to achieve the transfer characteristic of FIG. 5;

FIG. 8 is a block diagram of a TSAD in accordance with an embodiment of the present invention;

DETAILED DESCRIPTION OF THE PREFERRED EMBODIMENTS

Figure 1:
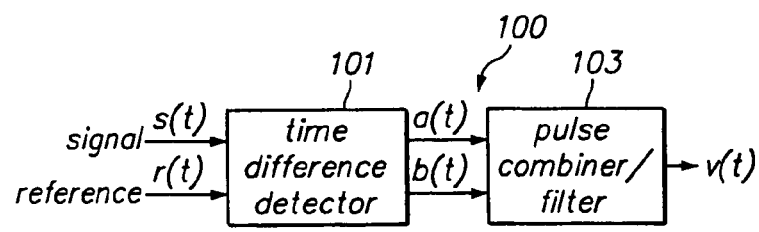
FIG. 1 is a block diagram of a known time shift angle demodulator (TSAD)
Figure 2:
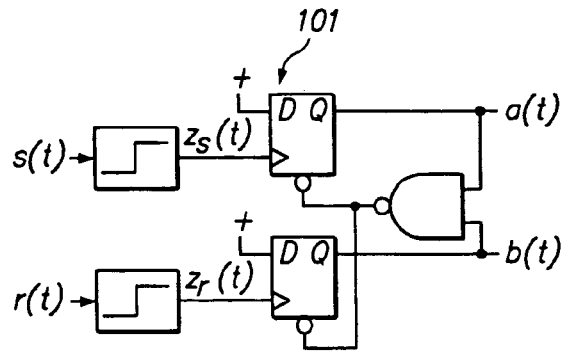
FIG. 2 is a diagram of the time difference detector of FIG. 1.
Figure 3:
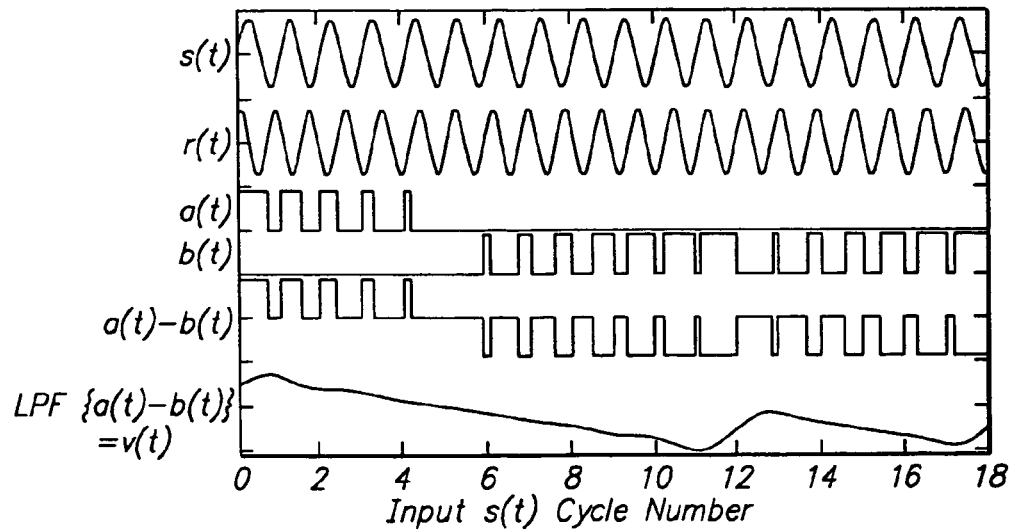
FIG. 3 is a timing diagram illustrating operation of the TSAD of FIG. 1.

Referring now to FIG. 8, a diagram is shown of a time difference angle demodulator (TSAD) in accordance with an illustrative embodiment of the invention. The TSAD receives the same input signals and produces the same output signal as the TSAD of FIG. 6 but is simpler and potentially more accurate.

As seen in FIG. 8, the TSAD includes a first forward path 810 and a second forward path 820. The first forward path may be the same as corresponding portions of the TSAD of FIG. 6. That is, the input signal s(t) and the reference signal r(t) are applied to a sequential phase-frequency detector (S-PFD) 811, which produces a lead signal $\overline{D}$ and a lag signal $\overline{U}$. The latter signals are applied to a pulse combiner/filter circuit 813, which produces an "aliased" output signal v(t). A summation circuit 815 combines the aliased output signal v(t) with a correction factor 817 to produce an "unwrapped" output signal $v_u$. The summation circuit and the second forward path together realize a phase unwrapping circuit.

In the second forward path 820, a post-processing circuit 821 receives both the input signals to and the output signals from the S-PFD, i.e., the input signals s(t) and r(t) and the output signals $\overline{D}$ and $\overline{U}$. In response to these signals, the post-processing circuit produces an output signal n, indicating which of the multiple line segments of FIG. 4 the aliased output signal v(t) represents. The output signal n may be any integer value (positive, negative, or zero), implying that the range of the improved TSAD is limited only by the resolution (i.e., number of bits) of the output signal n.

The output signal n is applied to a multiplier 823 and multiples a constant value $2\pi K$. The result is applied to the summation circuit 815 and is subtracted from the aliased output signal v(t) to produce the unwrapped output signal $v_u$. Whereas the signal vu is a measure of the phase of the input signal s(t), a measure of the frequency of the input signal s(t) may be easily derived by taking the derivative of $v_u$ to produce an output signal $v_u$. An optional differentiation circuit (which in some realizations may be a DSP or other processor) may be used for this purpose.

Figure 4:
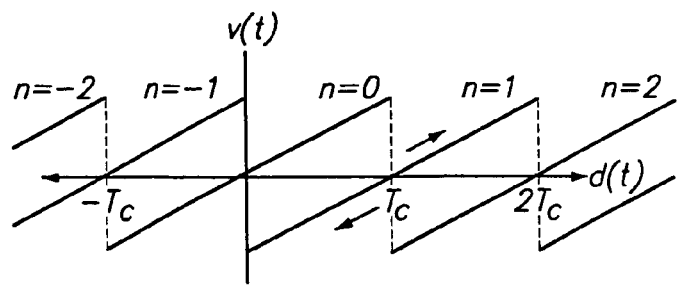
FIG. 4 is a plot of a transfer characteristic of the TSAD of FIG. 1.
Figure 7:
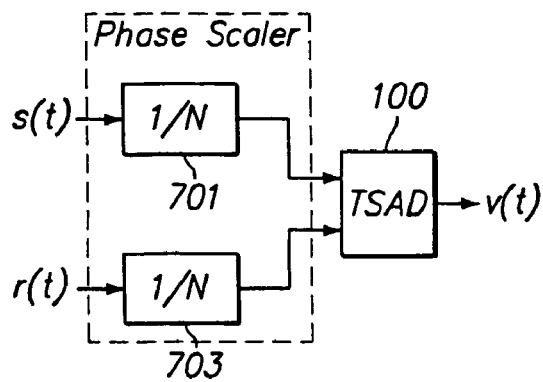
FIG. 7 is a diagram of a phase scaler preprocessor used to achieve the transfer characteristic of FIG. 5.

Analysis shows that the following rules may be used to correctly identify a transition from a given line segment of FIG. 4 to an adjacent line segment to the right (calling for the output signal n of the post processor to be incremented), and a transition from a given line segment to an adjacent line segment to the left (calling for the output signal n of the post processor to be decremented):

If $\overline{D}$=0 and s(t)↑, ++n;

If $\overline{U}$=0 and r(t)↑, --n, where the up-arrow symbol represents a rising transition.

The post processor may be realized using any of a variety of logic circuits that implement the foregoing rules. Examples of such circuits are shown in FIG. 9 and FIG. 10.

Figure 9:
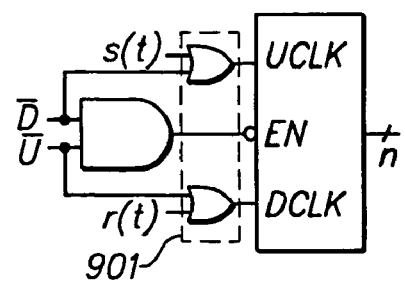
FIG. 9 is a diagram of one post-processing unit that may be used in the TSAD of FIG. 8.

Referring to FIG. 9, the signals $\overline{U}$ and $\overline{D}$ are logically ANDed together and the result is applied to the enable input of an up/down counter. The signal s(t) is applied to a UCLK input of the counter, and the signal r(t) is applied to a DCLK input of the counter. The output signal n of the counter is the output signal of the post processor 821. The logic gates 901 function to disable counting during normal operation.

Figure 10:
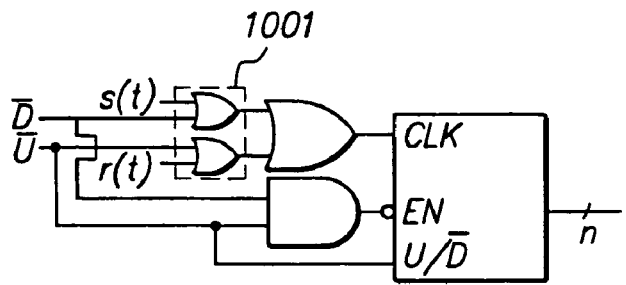
FIG. 10 is a diagram of another post-processing unit that may be used in the TSAD of FIG. 8.

Referring to FIG. 10, the signals $\overline{U}$ and $\overline{D}$ are again logically ANDed together and the result is applied to the enable input of an up/down counter 1001. In addition, the $\overline{U}$ signal is applied to a U/D input of the counter. The signal s(t) and the signal r(t) are logically ORed together, and the result is applied to a CLK input of the counter. The output signal n of the counter is the output signal of the post processor. The logic gates 1001 function to disable counting during normal operation.

Figure 11:
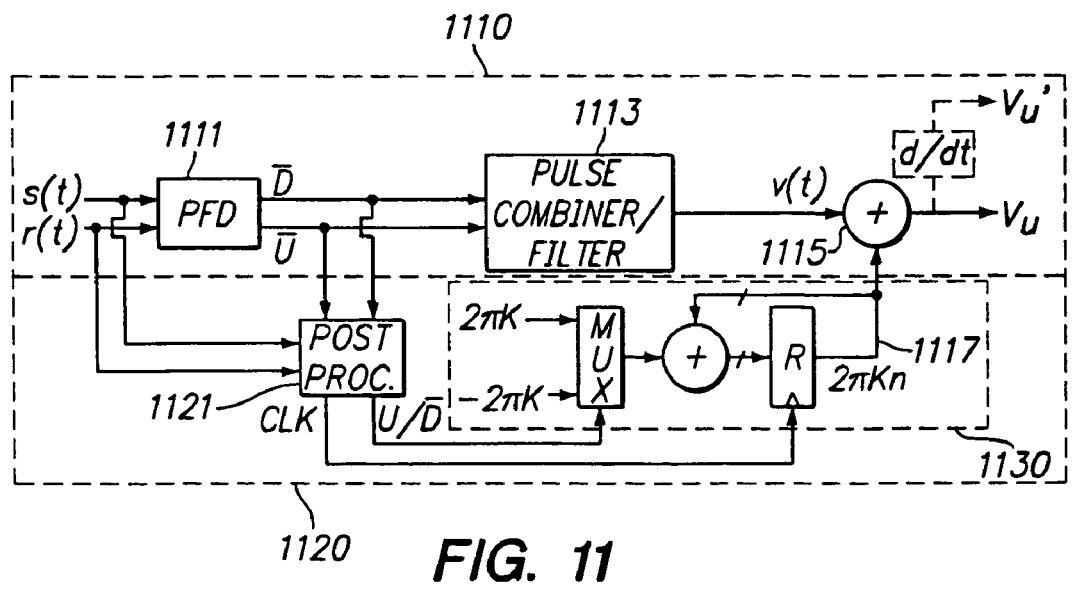
FIG. 11 is a block diagram of a TSAD in accordance with another embodiment of the present invention.

Assuming a post-processing circuit like that of FIG. 10, the TSAD may be simplified as shown in FIG. 11. In particular, in FIG. 11, the multiplier of FIG. 8 is replaced by circuitry 1130, including a multiplexer and an accumulator comprising an adder and a register R. In operation, increments of $2\pi K$ are added or subtracted from the contents of the accumulator in accordance with the signals U/$\overline{D}$ and CLK produced by the post-processing circuit 1121. The substantial overhead of a multiplier is therefore avoided.

Thus there has been described a time shift angle demodulator that provides for linear operation over a range of arbitrary extent and that is simple in construction. By performing post-processing of both the input and output signals of a time difference detector (PFD), improved accuracy may be obtained.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of measuring the phase or frequency of a periodic input signal using a periodic reference signal, comprising:

comparing the input signal to the reference signal to obtain a lead signal and a lag signal;

producing a phase or frequency signal using the lead signal, the lag signal and a count signal, and using the lead signal and the lag signal to form a difference signal, and filtering the difference signal to produce an aliased output signal;

changing the count of an up/down counter in dependence on the input signal, the reference signal, the lead signal and the lag signal; and adding to the aliased output signal a correction signal representing a positive or negative phase increment to form an unwrapped output signal;

wherein the correction signal is formed using the count of the up/down counter.

2. An apparatus for measuring the phase or frequency of a periodic input signal using a periodic reference signal, comprising:

a comparison circuit for comparing the input signal to the reference signal to obtain a lead signal and a lag signal;

a logic circuit, including an up/down counter, responsive to the input signal, the reference signal, the lead signal and the lag signal to change the count of the up/down counter;

means for using the lead signal, the lag signal and a count signal to produce a phase or frequency signal;

a pulse combiner/filter responsive to the lead signal and the lag signal to form a difference signal, and a filter for filtering the difference signal to produce an aliased output signal;

an adder for adding to the aliased output signal a correction signal representing a positive or negative phase increment to form an unwrapped output signal, and circuitry for forming the correction signal using the count of the up/down counter.

3. The apparatus of claim 2, wherein the circuitry for forming the correction signal comprises a multiplier having as one input signal a constant value and having as another input signal the count of the up/down counter.

4. A method for measuring the phase or frequency of an input signal by comparing it to a reference signal; comprising:

based upon the input signal and the reference signal, deriving a lead signal and a lag signal;

based directly upon the input signal, the reference signal, the lead signal, and the lag signal, deriving a count related to a phase difference between the input signal and the reference signal;

based upon the steps of deriving a count signal and deriving the lead and the lag signals, deriving an unwrapped phase difference signal between the input signal and the reference signal, the step of deriving an unwrapped phase difference signal comprising:

deriving a difference signal from the lead signal and the lag signal;

filtering the difference signal;

producing from the count signal a correction signal; and adding the correction signal to the filtered signal.

* * * * *